(No Model.) 2 Sheets—Sheet 1.
E. C. WILLEFORD.
RIDING ATTACHMENT FOR CULTIVATORS.
No. 585,547. Patented June 29, 1897.
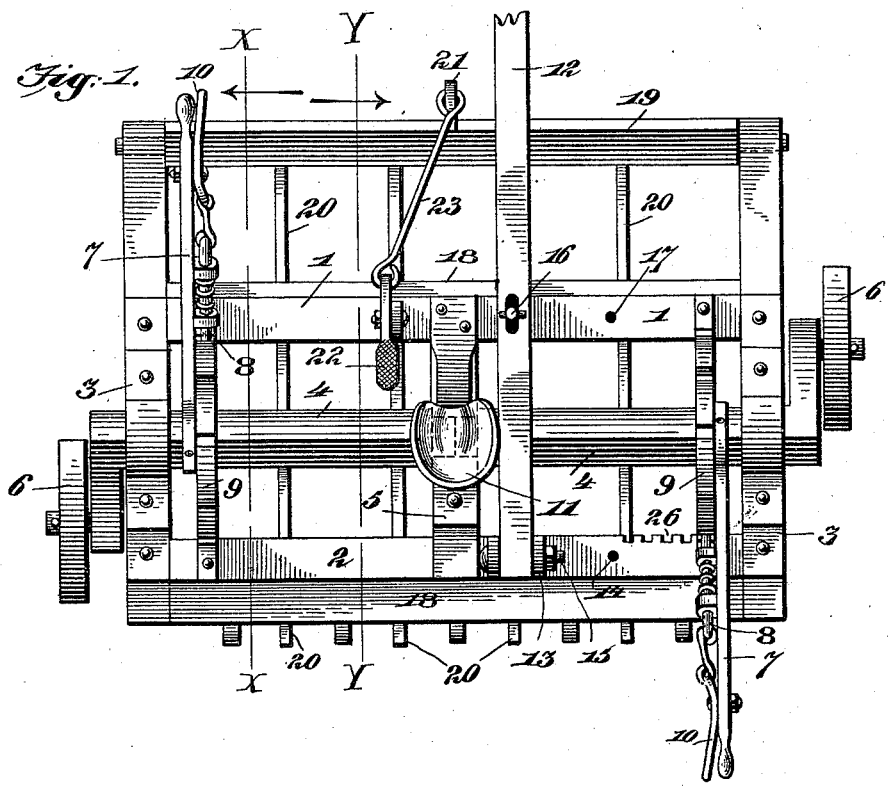
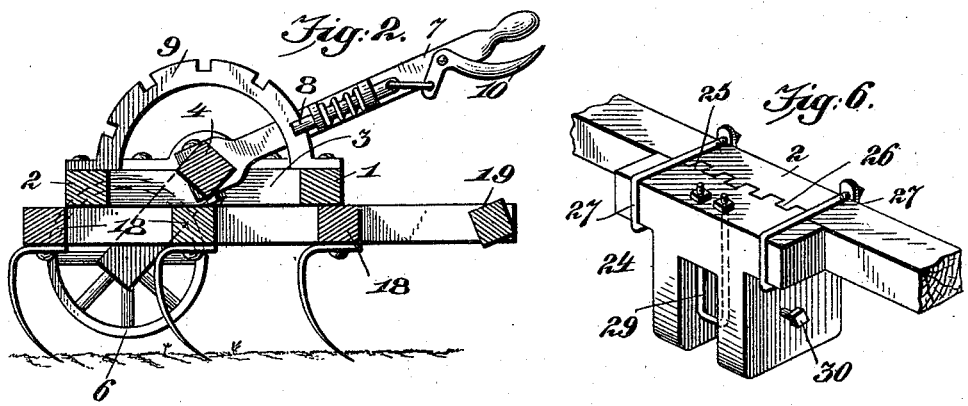
Witnesses
H. T. Dieterich
V. B. Hillyard
Inventor
Edwin C. Willeford
By his Attorneys,
C. A. Snow & Co.

(No Model.) 2 Sheets—Sheet 2.
E. C. WILLEFORD.
RIDING ATTACHMENT FOR CULTIVATORS.
No. 585,547. Patented June 29, 1897.
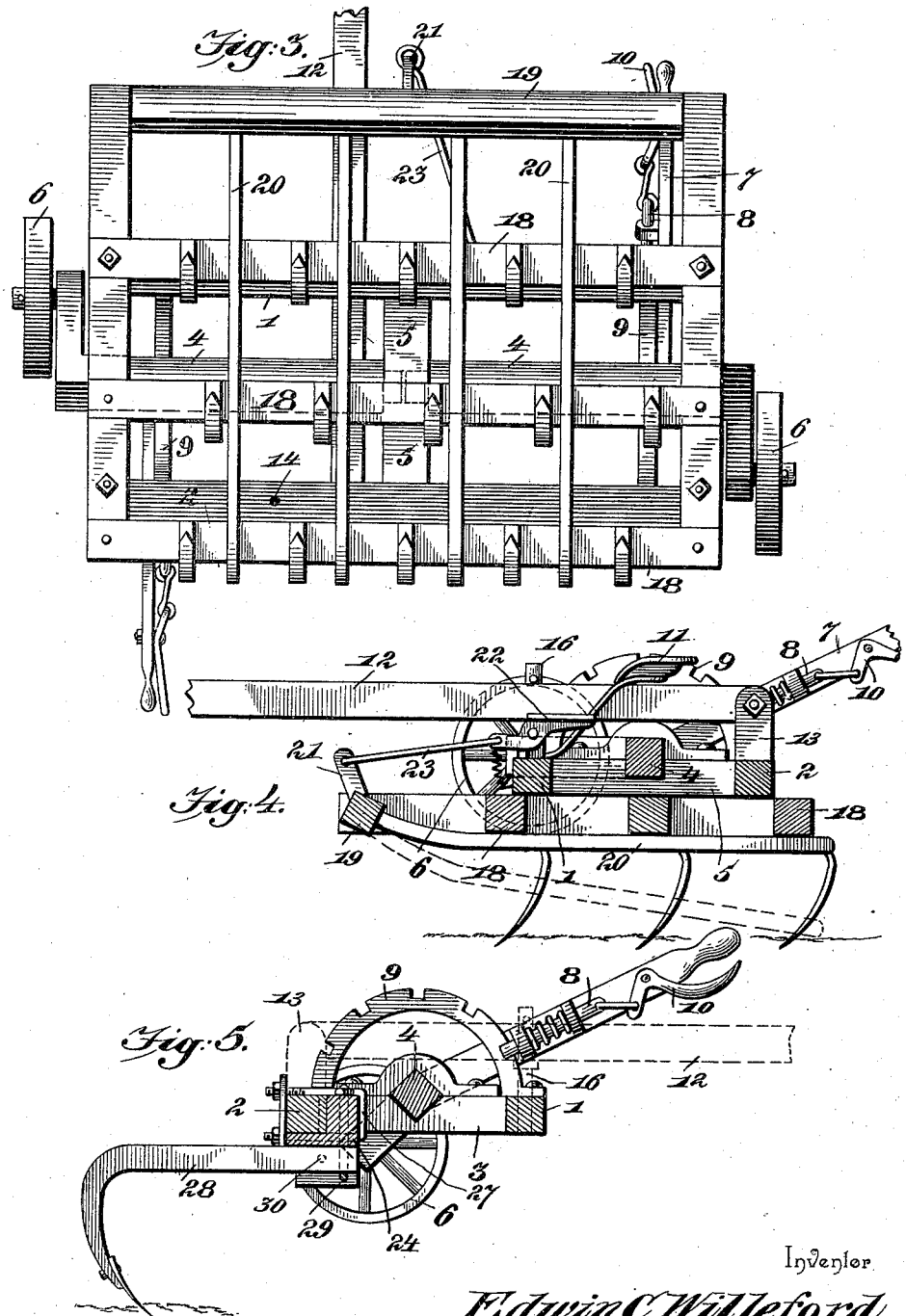

UNITED STATES PATENT OFFICE.

EDWIN C. WILLEFORD, OF ST. JAMES, MISSOURI.

RIDING ATTACHMENT FOR CULTIVATORS.

SPECIFICATION forming part of Letters Patent No. 585,547, dated June 29, 1897.

Application filed December 16, 1896. Serial No. 615,904. (No model.)

*To all whom it may concern:*

Be it known that I, EDWIN C. WILLEFORD, a citizen of the United States, residing at St. James, in the county of Phelps and State of Missouri, have invented a new and useful Riding Attachment for Cultivators and Like Implements, of which the following is a specification.

This invention provides means to be applied to a cultivator, harrow, plow, or other agricultural implement which will enable the driver to ride and at the same time have the machine under control so as to cause it to run level irrespective of the nature of the ground, the attachment being in the nature of a truck or carriage having its supporting-wheels mounted upon crank-axles which have independent adjustment to enable either end of the implement to be raised or lowered to meet the surface conditions of the ground over which the implement is drawn. Combined with the truck or carriage is a bracket which is adapted to be detachably connected therewith and through which a breaking-plow is adapted to be applied when desired.

Other objects and advantages are contemplated and will appear as the nature of the invention is more fully understood; and to this end reference is to be had to the following description and the accompanying drawings, in which corresponding and like parts are referred to and designated by the same reference-characters.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of the invention, showing it applied to a harrow. Fig. 2 is a longitudinal section thereof on the line X X of Fig. 1, looking in the direction of the arrow. Fig. 3 is an inverted view of the construction illustrated in Fig. 1. Fig. 4 is a longitudinal section on the line Y Y of Fig. 1, looking in the direction of the arrow. Fig. 5 is a detail view showing a breaking-plow applied to the carriage or truck. Fig. 6 is a detail view of the bracket and a portion of the truck-frame by means of which the plow is applied thereto.

The frame of the riding attachment, truck, or carriage is of approximately rectangular form and comprises a front bar 1, a rear bar 2, and side bars 3, all being rigidly connected together at their meeting ends. Independent crank-axles 4 are mounted in bearings provided on the side bars 3 and have their inner ends journaled in a bearing common to each provided on an intermediate bar 5, and the ground or supporting wheels 6 are loosely mounted upon the spindles at the outer ends of their crank-arms. These crank-axles 4 aline transversely of the carriage, and each has an operating-lever 7 attached thereto to serve as a means for turning the crank-axles in their bearings so as to raise or lower the frame, as required. Each lever 7 is supplied with a latch-bolt 8 to engage with notched segment 9, so as to hold the operating-lever in an adjusted position, and a hand-latch 10 is fulcrumed to each lever and has connection with the corresponding latch-bolt, so as to withdraw the latter from engagement with its notched segment when it is required to release a crank-axle to move it for changing the elevation of one or both ends of the carriage.

The driver's seat 11 is secured to the frame at an intermediate point, thereby bringing both operating-levers 7 within convenient reach, whereby the carriage is at all times under the control of the driver.

The pole or tongue 12 has connection with the frame of the carriage or truck so as to be shiftable laterally, according to the nature of the work or the kind of implement applied to the truck. A block 13, notched in its upper end and having a shank, is adapted to be fitted into one of a series of openings 14 in the rear bar 2, thereby making provision for laterally shifting the rear end of the pole or tongue, the latter being received in the notched end of the block and held therein by a transverse pin 15. A pin or set-screw 16 has screw-thread connections with the front bar 1 and passes through an opening near the rear end of the pole and is adapted to be fitted into one of the series of openings 17 in the front bar 1, thereby admitting of the pole or tongue being bodily shifted laterally when required. The elevation of the outer or front end of the pole or tongue can be regulated by a proper adjustment of the set-screw 16, thereby raising or lowering the front end of the implement secured to the carriage, and consequently changing the pitch of the teeth or shovels applied thereto.

The harrow illustrated comprises a series of toothed bars 18, transversely disposed in parallel relation, and a front bar 19, journaled at its ends to the side bars of the harrow-frame. Rods 20 are attached at their front ends to the bar 19 and extend the full length of the harrow and are spaced apart at proper distances, so as to come between the harrow-teeth. These rods 20 normally rest against the under side of the toothed bars, so as to be out of the way of the action of the harrow-teeth, and serve as clearers to remove grass, trash, and other accumulation tending to adhere to the harrow-teeth and impede the efficiency of the implement. An arm 21 is secured to the bar 19 and extends upwardly and forwardly and has connection with a foot-lever 22 by means of a link 23, the foot-lever 22 being of elbow shape and fulcrumed to a standard adjacent to the driver's seat, so as to be pressed upon when it is required to clear the harrow-teeth of any foreign matter.

A bracket 24 is notched or bifurcated at its lower end, and its upper end is extended laterally, forming a cross-head which is notched or toothed on its rear side, as shown at 25, to match with corresponding teeth 26, formed on the inner side of the rear bar 2, thereby positively securing the bracket in an adjusted position. Clips 27 embrace the end portion of the cross-head of the bracket and the rear bar 2 and hold the bracket in place.

A plow 28, of any desired pattern or style of construction, is adapted to be secured to the lower end of the bracket 24 and is held in place by means of a clip 29 and a binding-screw 30. It will be understood that when the plow 28 is used the harrow is omitted and that any kind of agricultural implement is adapted to be secured to the carriage in any convenient way, either by being bolted thereto or fastened in any substantial manner.

The sole purpose of the improvement is to provide a riding attachment or carriage which can be applied to any make or style of implement and which will admit of the latter being raised or lowered or adjusted with reference to the surface of the ground to suit the nature of the work in hand. If one end of the implement is too low or too high, the operating-lever 7 corresponding to the side requiring adjustment is moved to secure the desired adjustment and is held in the located position by its latch-bolt 8 engaging with the coöperating notched segment 9. It will thus be seen that the riding attachment can also be used as means for leveling or adjusting the implement applied thereto, as well as for regulating the depth of cultivation or plowing.

Having thus described the invention, what is claimed as new is—

1. In a harrow or similar implement, the combination of a series of teeth, a transversely-disposed bar journaled to the frame of the implement, a series of rods secured at one end to the said bar and extending between the teeth, and means under the control of the driver for turning the bar in its bearings to throw the rods in engagement with the ground and remove trash and other adhering matter from the teeth of the implement, substantially as set forth.

2. In a harrow or like implement provided with transversely-disposed bars bearing teeth, the combination of a front bar journaled at its ends to the frame of the implement, rods secured at their front ends to the transverse bar and extending between the teeth, an arm projecting from the bar, a foot-lever, a link connecting the foot-lever with the said arm, and a spring for returning the parts to a normal position and holding the rods up out of the way, substantially as set forth.

3. In combination, in a riding attachment for agricultural implements, a frame-bar having a toothed portion, a bracket comprising a cross-head toothed to match the toothed portion of the frame-bar and having a pendent bifurcated portion to receive the beam of a plow or other implement, clips engaging with the terminal portions of the cross-head and connecting the bracket with the toothed frame-bar in an adjusted position, and means applied to the cross-head and pendent portion of the bracket for connecting an implement therewith, substantially as set forth.

In testimony that I claim the foregoing as my own I have hereto affixed my signature in the presence of two witnesses.

EDWIN C. WILLEFORD.

Witnesses:
WM. FORT,
ALFRED SMITH.